United States Patent
Shibuya et al.

(10) Patent No.: US 10,759,972 B2
(45) Date of Patent: Sep. 1, 2020

(54) ADHESIVE TAPE

(71) Applicant: Maxell Holdings, Ltd., Otokuni-gun, Kyoto (JP)

(72) Inventors: Masanao Shibuya, Ibaraki (JP); Yusuke Kato, Ibaraki (JP); Takayuki Shimoda, Ibaraki (JP); Katsumi Hashimoto, Ibaraki (JP); Takahiro Sakai, Ibaraki (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 0 days.

(21) Appl. No.: 15/052,401

(22) Filed: Feb. 24, 2016

(65) Prior Publication Data
US 2016/0244643 A1    Aug. 25, 2016

(30) Foreign Application Priority Data
Feb. 25, 2015    (JP) .................... 2015-035649

(51) Int. Cl.
*C09J 7/24* (2018.01)
*C09J 7/20* (2018.01)
(Continued)

(52) U.S. Cl.
CPC . *C09J 7/24* (2018.01); *B32B 7/04* (2013.01); *B32B 7/06* (2013.01); *B32B 7/10* (2013.01); *B32B 7/12* (2013.01); *B32B 2250/02* (2013.01); *B32B 2250/04* (2013.01); *B32B 2307/75* (2013.01); *B32B 2405/00* (2013.01); *C08K 5/00* (2013.01); *C08K 5/0025* (2013.01); *C08K 5/1515* (2013.01); *C08K 5/56* (2013.01); *C08L 33/00* (2013.01); *C08L 63/00* (2013.01); *C08L 67/00* (2013.01); *C08L 75/00* (2013.01); *C08L 2312/00* (2013.01); *C09J 7/10* (2018.01); *C09J 7/20* (2018.01); *C09J 7/30* (2018.01); *C09J 7/38* (2018.01); *C09J 7/381* (2018.01); *C09J 7/385* (2018.01); *C09J 163/00* (2013.01);
(Continued)

(58) Field of Classification Search
None
See application file for complete search history.

(56) References Cited

U.S. PATENT DOCUMENTS

| | | | | |
|---|---|---|---|---|
| 5,151,493 A | * | 9/1992 | Smith | C08J 5/18 528/272 |
| 5,824,448 A | * | 10/1998 | Liu | G03F 3/10 430/143 |

(Continued)

FOREIGN PATENT DOCUMENTS

| | | | |
|---|---|---|---|
| JP | 2005-220337 A | * | 8/2005 |
| JP | 2012-188479 A | | 10/2012 |

*Primary Examiner* — Vivian Chen
(74) *Attorney, Agent, or Firm* — Birch, Stewart, Kolasch & Birch, LLP (57) ABSTRACT

The adhesive tape includes: a resin layer that is formed by applying resin coating, the resin coating containing a resin having an acid number of 50 mg/g or more and 130 mg/g or less, and at least one type of cross-linking agent selected from between an epoxy-based cross-linking agent and a metal chelate cross-linking agent; and an adhesive layer that is laminated on or above the resin layer, and is formed by applying adhesive coating, the adhesive coating containing a resin including a hydroxyl group, and a metal chelate compound.

8 Claims, 4 Drawing Sheets

(51) Int. Cl.
*C09J 7/38* (2018.01)
*C09J 167/00* (2006.01)
*C09J 175/04* (2006.01)
*C09J 201/08* (2006.01)
*C09J 7/10* (2018.01)
*C09J 163/00* (2006.01)
*C09J 7/30* (2018.01)
*C08L 33/00* (2006.01)
*C08L 67/00* (2006.01)
*C08L 63/00* (2006.01)
*C08L 75/00* (2006.01)
*B32B 7/04* (2019.01)
*B32B 7/12* (2006.01)
*B32B 7/06* (2019.01)
*B32B 7/10* (2006.01)
*C08K 5/1515* (2006.01)
*C08K 5/00* (2006.01)
*C08K 5/56* (2006.01)

(52) U.S. Cl.
CPC ............ *C09J 167/00* (2013.01); *C09J 175/04* (2013.01); *C09J 201/08* (2013.01); *C09J 2201/122* (2013.01); *C09J 2201/60* (2013.01); *C09J 2203/30* (2013.01); *C09J 2203/318* (2013.01); *C09J 2205/10* (2013.01); *C09J 2205/106* (2013.01); *C09J 2433/00* (2013.01); *C09J 2433/006* (2013.01); *C09J 2467/00* (2013.01); *C09J 2467/006* (2013.01); *C09J 2475/00* (2013.01); *C09J 2475/006* (2013.01); *Y10T 428/1091* (2015.01); *Y10T 428/14* (2015.01); *Y10T 428/1476* (2015.01); *Y10T 428/1481* (2015.01); *Y10T 428/2486* (2015.01); *Y10T 428/2495* (2015.01); *Y10T 428/24802* (2015.01); *Y10T 428/24942* (2015.01); *Y10T 428/24959* (2015.01); *Y10T 428/265* (2015.01); *Y10T 428/266* (2015.01); *Y10T 428/269* (2015.01); *Y10T 428/28* (2015.01); *Y10T 428/287* (2015.01); *Y10T 428/2852* (2015.01); *Y10T 428/2891* (2015.01); *Y10T 428/2896* (2015.01); *Y10T 428/31554* (2015.04); *Y10T 428/31565* (2015.04); *Y10T 428/31576* (2015.04); *Y10T 428/31786* (2015.04); *Y10T 428/31794* (2015.04); *Y10T 428/31797* (2015.04); *Y10T 428/31928* (2015.04); *Y10T 428/31935* (2015.04)

(56) References Cited

U.S. PATENT DOCUMENTS

| | | | | |
|---|---|---|---|---|
| 6,063,898 | A * | 5/2000 | Endo | C07D 303/16 430/283.1 |
| 2003/0138624 | A1* | 7/2003 | Burmeister | B01J 13/02 428/343 |
| 2006/0177654 | A1* | 8/2006 | Shoshi | C09J 7/29 428/354 |
| 2006/0194042 | A1* | 8/2006 | De Carolis | B32B 27/32 428/354 |
| 2007/0031660 | A1* | 2/2007 | Kanamaru | B32B 7/12 428/355 AC |
| 2007/0110966 | A1* | 5/2007 | Warren | B41M 3/12 428/195.1 |
| 2008/0160300 | A1* | 7/2008 | Hwang | B32B 7/12 428/345 |
| 2010/0143638 | A1* | 6/2010 | Nakabayashi | B82Y 10/00 428/65.1 |
| 2010/0215882 | A1* | 8/2010 | Yanagi | C09J 5/00 428/41.3 |
| 2012/0177901 | A1* | 7/2012 | Hirose | C09J 7/26 428/213 |
| 2012/0208016 | A1* | 8/2012 | Takahira | C08G 18/4233 428/355 R |
| 2012/0208955 | A1* | 8/2012 | Yoshie | C09J 167/00 524/604 |
| 2012/0328873 | A1* | 12/2012 | Kishioka | B32B 7/12 428/337 |
| 2013/0220681 | A1* | 8/2013 | Saitou | H05K 3/1283 174/255 |
| 2014/0017467 | A1* | 1/2014 | Inao | C09J 7/38 428/214 |
| 2014/0202749 | A1* | 7/2014 | Saitou | C08F 220/06 174/257 |
| 2015/0056441 | A1* | 2/2015 | Cho | C09J 5/02 428/346 |

* cited by examiner

ADHESIVE TAPE

CROSS REFERENCE TO RELATED APPLICATIONS

This application is based on and claims priority under 35 USC § 119 from Japanese Patent Application No. 2015-35649 filed Feb. 25, 2015.

BACKGROUND

Technical Field

The present invention relates to an adhesive tape.

Related Art

A display apparatus (liquid crystal display apparatus, organic EL display apparatus) including a display panel such as a liquid crystal panel or an organic EL panel and a transparent panel to be attached to the front surface side of the display panel is used for mobile phones, smartphones, Personal Digital Assistants (PDAs), electric dictionaries, and the like.

In such a display apparatus, an adhesive tape with excellent optical characteristics is used for reducing the thickness and weight of the overall apparatus, improving visibility, attaching various kinds of members to each other and the like. For example, Japanese Patent Application Laid-Open Publication No. 2012-188479 discloses a two-sided adhesive tape for attaching a transparent panel to an image display apparatus.

SUMMARY

In a display apparatus such as a liquid crystal display apparatus or an organic EL display apparatus, a decorative portion such as various kinds of letters, figures, or multi-colored frame may be provided on a back side of a transparent panel for giving a design or distinguishability, in some cases. Alternatively, an electrode with low resistance or a printed circuit may be provided on the back side of the transparent panel, in some cases. As one example of a method for providing a decorative portion or a printed circuit to a backside of a transparent panel, there is a method in which decorative printing is performed, for forming a decorative portion or a printed circuit, on one side (a surface of a PET film or a hard coat processed surface) of an adhesive tape in which an antiscattering film made of a PET film base, a hard coat processed PET film base, or the like and a two-sided adhesive layer with no base material and with excellent optical characteristics are attached to each other, and the adhesive tape is attached to the transparent panel.

The adhesive tape on which such decoration is to be printed preferably has good optical characteristics so as to prevent reduction in visibility on a display apparatus, and is preferably thin so as to reduce the thickness and weight of the display apparatus. To improve the optical characteristics of the adhesive tape and to reduce the thickness and weight thereof, there is another method for forming a base on which decorative printing is to be performed, in which a resin layer and an adhesive layer forming a base are formed by application of coating materials, instead of using a conventional base sheet made of PET or the like as the base.

However, in an adhesive tape in which the resin layer and the adhesive layer are formed by the application, printability in decorative printing may be decreased or adhesive force of the adhesive layer may be deteriorated over time in some cases, depending on types of the resins and cross-linking agent forming the resin layer and the adhesive layer.

An object of this invention is to obtain an adhesive tape having a good printability and preventing deterioration of the adhesive force over time.

An adhesive tape to which the present invention is applied includes: a resin layer that is formed by applying resin coating, the resin coating containing a resin having an acid number of 50 mg/g or more and 130 mg/g or less, and at least one type of cross-linking agent selected from between an epoxy-based cross-linking agent and a metal chelate cross-linking agent; and an adhesive layer that is laminated on or above the resin layer, and is formed by applying adhesive coating, the adhesive coating containing a resin including a hydroxyl group, and a metal chelate compound.

Further, the resin having the acid number, contained in the resin layer, is at least one type selected from among an acrylic resin, a polyester resin, and an urethane resin.

Furthermore, the resin including the hydroxyl group, contained in the adhesive layer, is at least one type selected from between an acrylic resin and an urethane resin.

Still furthermore, thickness of the resin layer is 10 μm or less, and thickness of the adhesive layer is 15 μm or less.

Still furthermore, the resin layer and the adhesive layer are formed by laminating, by a wet-on-wet method, the resin coating and the adhesive coating on a releasable substrate.

Still furthermore, the adhesive layer is attachable to a back side of a cover member of a transparent panel used for a front surface of a display apparatus where an image is displayable.

According to an aspect of the present invention, there is provided an adhesive tape which has good printability and of which adhesive force is prevented from deteriorating over time.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described.

[Configuration of Adhesive Tape]

Figure 1:
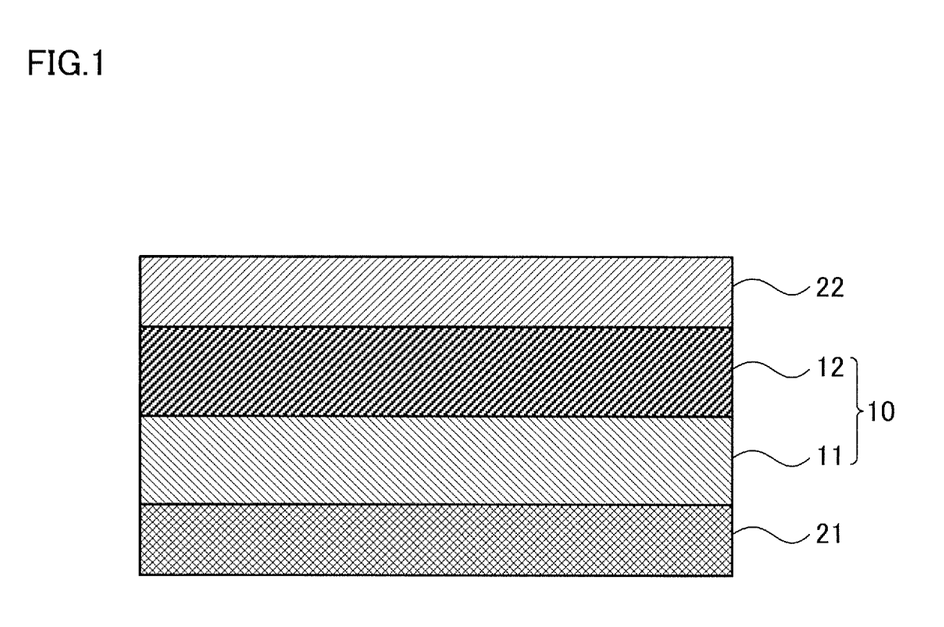
FIG. 1 is a diagram illustrating one example of a configuration of an adhesive tape to which the exemplary embodiment is applied.

FIG. 1 is a diagram illustrating one example of a configuration of an adhesive tape 10 to which the exemplary embodiment is applied. As shown in FIG. 1, the adhesive tape 10 of the exemplary embodiment includes a resin layer 11, and an adhesive layer 12 laminated on the resin layer 11. In addition, as shown in FIG. 1, a first release liner 21 and a second release liner 22, which are releasable from the resin layer 11 and the adhesive layer 12, respectively, are provided on the both sides of the adhesive tape 10 in the exemplary embodiment.

Here, the adhesive tape 10 of the exemplary embodiment is formed by various kinds of methods to be described later, and is a coating-type adhesive tape in which both of the resin layer 11 and the adhesive layer 12 are formed by applying resin coating and adhesive coating and drying the resin coating and the adhesive coating, or by applying resin coating and curing the coating with radiation. Note that "coating-type" indicates that the tape is formed by a method including a process of applying coating in this specification.

The adhesive tape 10 of the exemplary embodiment is used in such a manner that printing is performed on a partial region of the resin layer 11, and the adhesive layer 12 side is attached to a transparent panel (cover glass) provided on a front surface of a display apparatus such as a liquid crystal display apparatus or an organic EL display apparatus used for a mobile phone, a smartphone, or the like, although the detailed description thereof will be given later.

In the adhesive tape 10 of the exemplary embodiment, the total thickness of the resin layer 11 and the adhesive layer 12 is preferably 25 μm or less. The total thickness of the resin layer 11 and the adhesive layer 12 is preferably thinner since the thickness of the display apparatus such as the liquid crystal display apparatus or the organic EL display apparatus is enabled to be reduced in the case where the adhesive tape 10 is used for the display apparatus. However, the total thickness of the resin layer 11 and the adhesive layer 12 is preferably 10 μm or more to maintain the adhesive force of the adhesive tape 10 by the adhesive layer 12 and the strength of the adhesive tape 10.

In the adhesive tape 10 of the exemplary embodiment, the thickness of the resin layer 11 is preferably 10 μm or less, and more preferably 8 μm or less. In the case where the thickness of the resin layer 11 is more than 10 μm, it is difficult to make the total thickness of the adhesive tape 10 thinner.

In addition, the thickness of the resin layer 11 is preferably 5 μm or more. In the case where the thickness of the resin layer 11 is less than 5 μm, it may be difficult to maintain the physical property of the resin layer 11 in some cases.

The haze ((diffusion light transmittance/total light transmittance)×100) of the adhesive tape 10 of the exemplary embodiment is preferably 1.5% or less, and more preferably 1.2% or less. Although the detailed description thereof will be given later, the light entering the adhesive tape 10 tends to diffuse in the case where the haze of the adhesive tape 10 is more than 1.5%, which may cause reduction in visibility on the display apparatus such as the liquid crystal display apparatus or the organic EL display apparatus in the case where the adhesive tape 10 is used in the display apparatus. Note that, it is preferable that the haze of the adhesive tape 10 is lower, from the point of view of reducing diffusion of light in the case of using the adhesive tape 10 in the display apparatus.

The total light transmittance of the adhesive tape 10 of the exemplary embodiment is preferably 90% or more, and more preferably 95% or more. In the case where the total light transmittance of the adhesive tape 10 is less than 90%, the transparency of the adhesive tape 10 is decreased, which may cause reduction in visibility on the display apparatus such as the liquid crystal display apparatus or the organic EL display apparatus in the case where the adhesive tape 10 is used in the display apparatus. Incidentally, it is preferable that the total light transmittance of the adhesive tape 10 is higher from the point of view of suppressing reduction in visibility on the display apparatus.

In the adhesive tape 10 of the exemplary embodiment, the adhesion force on the adhesive layer 12 side to a glass plate is preferably 1.5 N/10 mm or more, and more preferably 4 N/10 mm or more. In the exemplary embodiment, the adhesion force to the glass plate is referred to as 180° peel adhesive strength to a glass plate measured by a method similar to an adhesion test given by JIS Z0237 (2009).

In the case where the adhesion force of the adhesive tape 10 on the adhesive layer 12 side to the glass plate is less than 1.5 N/10 mm, the adhesive tape 10 may come off or slide in the case where the adhesive tape 10 is attached to a transparent panel or the like of the display apparatus such as the liquid crystal display apparatus or the organic EL display apparatus.

The adhesion force of the adhesive tape 10 on the adhesive layer 12 side to the glass plate is preferably 8N/10 mm or less. In the case where the adhesion force of the adhesive tape 10 on the adhesive layer 12 side to the glass plate is excessively large, reworkability of the adhesive tape 10 may decrease. In this case, adhesive deposit may be caused when the adhesive tape 10 is removed for reusing the transparent panel or other cases.

In the adhesive tape 10 of the exemplary embodiment, the storage elastic modulus of the resin layer 11 at 23° C., which is measured by dynamic viscoelasticity, (hereinafter, simply referred to as the storage elastic modulus of the resin layer 11) is preferably $5 \times 10^5$ Pa or more, and more preferably $1 \times 10^7$ Pa or more. In the case where the storage elastic modulus of the resin layer 11 is less than $5 \times 10^5$ Pa, decorative printing on the resin layer 11 side of the adhesive tape 10 may be difficult in some cases. Specifically, for example, in the case where the decorative printing is performed on the resin layer 11 by screen printing, a screen printing plate may be difficult to be removed from the resin layer 11, and thereby the decorative printing may not be normally performed in some cases.

In addition, the storage elastic modulus of the resin layer 11 in the adhesive tape 10 is preferably $1 \times 10^{10}$ Pa or less. In the case where the storage elastic modulus of the resin layer 11 is more than $1 \times 10^{10}$ Pa, flexibility of the adhesive tape 10 may be decreased, or crack or whitening or the like may be caused in the resin layer 11 during handling. Further, the decrease of the flexibility of the adhesive tape 10 may cause difficulty in rewinding the adhesive tape 10, or decrease of trackability of the adhesive tape 10 when the adhesive tape 10 is attached to an adherend having a curve or unevenness, for example. The crack or whitening in the resin layer 11 causes decrease of the optical transmittance of the adhesive tape 10.

The glass transition temperature (Tg) of the resin layer 11 in the adhesive tape 10 is preferably −40° C. or more, and more preferably −10° C. or more. In addition, the glass transition temperature of the resin layer 11 is preferably 130° C. or less, and more preferably 60° C. or less. If the glass transition temperature is higher than 130° C., the flexibility of the adhesive tape 10 may be decreased, or a curing reaction by a cross-linking agent may be difficult to proceed in manufacturing the adhesive tape 10.

Note that, although each of the resin layer 11 and the adhesive layer 12 is configured of a single layer in the specific example shown in FIG. 1, one or each of the resin layer 11 and the adhesive layer 12 may be formed by plural layers, for example. In other words, the adhesive tape 10 may include plural resin layers 11, and/or plural adhesive layers 12. Further, another layer may be provided between the resin layer 11 and the adhesive layer 12.

It is preferable that the adhesive tape 10 has little curl in the state where the first release liner 21 on the resin layer 11 side is removed (while the second release liner 22 on the adhesive layer 12 side is not removed). In the case where the adhesive tape 10 has large curl, workability at the decorative printing on the resin layer 11 may be decreased depending on a printing method and print equipment.

The amount of the curl of the adhesive tape 10 is preferably within ±10 mm, and more preferably within ±5 mm.

As the measuring method of the curl of the adhesive tape 10, the following method is given, for example.

Specifically, the adhesive tape 10 is formed into a sheet having a size of 210 mm×150 mm, the sheet is placed on a flat plate, and a storage process having repeated 10 cycles in total is performed, and, in each of the cycles, the sheet is stored under a temperature cycle environment at 85° C. for 50 minutes and then at the ambient temperature for 10 minutes. As each cycle ends, the amount of the curl at the four corners of the sheet-shaped adhesive tape 10 with respect to the flat plate is measured, and the resultant values are determined to be the amount of the curl of the adhesive tape 10 in the method.

Usually, the reason of curl of the adhesive tape may relate to a manufacturing condition of the adhesive tape, an expansion rate or a shrinkage rate of the material used for the adhesive tape, coating thickness, and glass transition temperature of each layer, in some cases.

In the exemplary embodiment, the curl of the adhesive tape 10 is strongly correlated with the glass transition temperature of the resin layer 11. In the exemplary embodiment, in the case where the curl of the adhesive tape 10 should be set to be small at working for the decorative printing and the like, it is preferable that the glass transition temperature of the resin layer 11 is set to be low. Specifically, the glass transition temperature of the resin layer 11 is preferably 130° C. or less, more preferably 70° C. or less, and still more preferably 60° C. or less.

In addition, in the exemplary embodiment, the curl of the adhesive tape 10 is also correlated with the thickness of the resin layer 11. In the exemplary embodiment, the thickness of the resin layer 11 is preferably 10 μm or less, and more preferably 8 μm or less, from the standpoint of reduction in curl of the adhesive tape 10.

Next, the configuration of each layer of the adhesive tape 10 will be described concretely.

[Resin Layer 11]

The resin layer 11 of the exemplary embodiment is formed by resin coating containing a resin and a cross-linking agent.

(Resin)

The resin used for the resin layer 11 of the exemplary embodiment has an acid number in the range from 50 mg/g to 130 mg/g. The acid number of the resin used for the resin layer 11 is preferably in the range from 60 mg/g to 120 mg/g, and more preferably in the range from 70 mg/g to 110 mg/g. Note that the acid number of the resin is one of indexes representing an acid content, and represents the quantity of potassium hydrate in milligrams required to neutralize a resin of 1 gram including a carboxyl group.

By setting the acid number of the resin used for the resin layer 11 to such a range, the cross-linking performance in the resin layer 11 may be improved, and the strength of the resin layer 11 may be maintained. Further, by setting the acid number of the resin used for the resin layer 11 to such a range, ink is difficult to bleed at the decorative printing on the resin layer 11, and the printability with an excellent fixation property may be achieved.

Furthermore, by setting the acid number of the resin used for the resin layer 11 to such a range, excessive increase of the viscosity of the resin coating is prevented in the manufacturing process of the adhesive tape 10 to be described later, and decrease of coating performance of the resin coating is prevented.

In the case where the acid number of the resin used for the resin layer 11 is lower than 50 mg/g, the ink tends to swell on the resin layer 11 at the decorative printing on the resin layer 11, which may cause the printability of the resin layer 11 to be decreased.

It is preferable that the acid number of the resin is higher, since cross-linkage of the resin layer 11 proceeds faster, and the printability is improved. However, usually, it is difficult to prepare the resin coating forming the resin layer 11 by using a resin having the acid number higher than 130 mg/g. That is, in the case where the resin having the acid number higher than 130 mg/g is used for preparing the resin coating, aggregate of acid components such as an acrylic acid is generated in the resin, which causes difficulty in preparing the resin coating. In addition, in the case where the resin having the acid number higher than 130 mg/g is used, the resin layer 11 may be excessively hard, which may cause decrease of flexibility.

The resin used for the resin layer 11 of the exemplary embodiment is not particularly limited as long as the resin has the acid number of 50 mg/g or more and 130 mg/g or less, and any of a thermoplastic resin and a thermosetting resin may be used. In addition, an ionizing radiation curable resin may be combined with the aforementioned resins. The resin used for the resin layer 11 may include a carboxyl group, and other groups such as a hydroxyl group, an amino group, and double bonds, which contribute to cross-linkage.

Examples of the thermoplastic resin used for the resin layer 11 include an acrylic resin, polycarbonate, polystyrene, an urethane resin, an acrylonitrile-butadiene-styrene resin, and a polyolefin resin such as polyethylene or polypropylene.

Examples of the thermosetting resin used for the resin layer 11 include an urethane resin, an epoxy resin, a phenol resin, an urea resin, a melamine resin, a polyimide resin, and an unsaturated polyester resin.

Further, in the case where the ionizing radiation curable resin is combined with the thermoplastic resin or the thermosetting resin, an ultraviolet curable resin is preferably used as the ionizing radiation curable resin, and examples of the ultraviolet curable resin include urethane acrylate, epoxy acrylate, polyester acrylate, and polyether acrylate.

It is preferable to use, for the resin layer 11 of the exemplary embodiment, at least one type of resin selected from among an acrylic resin, a polyester resin, and an urethane resin in the aforementioned resins, and it is especially preferable to use an acrylic resin.

An acrylic resin ((meth)acrylic resin) used for the resin layer 11 is not particularly limited, and an example thereof is a functional group-containing (meth)acrylic polymer or the like obtained by copolymerizing acrylic acid alkyl esters and/or methacrylic acid alkyl esters having the carbon number of the alkyl group that is usually in the range from 2 to 18, a functional group-containing monomer, and, as necessary, another monomer for modification that is copolymerizable with the aforementioned materials. Among them, a functional group-containing (meth)acrylic polymer having the carbon number of the alkyl group not less than 6 is preferable.

A specific example of such a (meth)acrylic resin is Dianal (registered trademark in Japan) BR118 (manufactured by MITSUBISHI RAYON CO., LTD., the weight-average molecular weight is 350,000, Tg: 35° C.).

Examples of the polyester resin used for the resin layer 11 include aliphatic polyester, aliphatic polyester amide, and copolymer thereof.

Specific examples of such a polyester resin include elitel (registered trademark in Japan) UE3200 (manufactured by UNITIKA LTD., the weight-average molecular weight is 16,000, Tg: 65° C.), elitel (registered trademark in Japan) UE3201 (manufactured by UNITIKA LTD., the weight-average molecular weight is 20,000, Tg: 65° C.), elitel (registered trademark in Japan) UE3203 (manufactured by UNITIKA LTD., the weight-average molecular weight is 20,000, Tg: 60° C.), elitel (registered trademark in Japan) UE3210 (manufactured by UNITIKA LTD., the weight-average molecular weight is 40,000, Tg: 45° C.), elitel (registered trademark in Japan) UE3215 (manufactured by UNITIKA LTD., the weight-average molecular weight is 16,000, Tg: 45° C.), elitel (registered trademark in Japan) UE3216 (manufactured by UNITIKA LTD., the weight-average molecular weight is 18,000, Tg: 40° C.), elitel (registered trademark in Japan) UE3240 (manufactured by UNITIKA LTD., the weight-average molecular weight is 18,000, Tg: 40° C.), elitel (registered trademark in Japan) UE3250 (manufactured by UNITIKA LTD., the weight-average molecular weight is 18,000, Tg: 40° C.), elitel (registered trademark in Japan) UE3500 (manufactured by UNITIKA LTD., the weight-average molecular weight is 30,000, Tg: 35° C.), elitel (registered trademark in Japan) UE3620 (manufactured by UNITIKA LTD., the weight-average molecular weight is 16,000, Tg: 42° C.), elitel (registered trademark in Japan) UE9200 (manufactured by UNITIKA LTD., the weight-average molecular weight is 15,000, Tg: 65° C.), VYLON (registered trademark in Japan) UR4800 (manufactured by TOYOBO CO., LTD., the weight-average molecular weight is 25,000, Tg: 105° C.), and VYLON (registered trademark in Japan) UR8300 (manufactured by TOYOBO CO., LTD., the weight-average molecular weight is 30,000, Tg: 23° C.).

Examples of the urethane resin used for the resin layer 11 include a polyether urethane resin, a non-yellowing polyether urethane resin, an aromatic isocyanate ether-based urethane resin, a polyester urethane resin, a non-yellowing polyester urethane resin, an aromatic isocyanate ester-based urethane resin, a polyether-polyester urethane resin, and a non-yellowing polyether-polyester urethane resin.

(Solvent)

In the case where the resin layer 11 is prepared by using the aforementioned resin, the resin coating may be prepared by dissolving the resin in solvent, and be applied on a sheet member such as a release liner, or may be directly applied on a sheet member with no solvent.

In the case where the aforementioned resin is dissolved in solvent, the solvent is not particularly limited, and examples thereof may include methyl ethyl ketone (MEK), acetone, ethyl acetate, butyl acetate, methyl isobutyl ketone, toluene, xylene, and mixed solvent thereof.

(Cross-Linking Agent)

In the resin layer 11 of the exemplary embodiment, the aforementioned resin is cross-linked by at least one type of cross-linking agent selected from between an epoxy-type cross-linking agent and a metal chelate cross-linking agent. Specifically, in the resin layer 11, the carboxyl group included in the aforementioned resin is cross-linked by at least one type of cross-linking agent selected from between the epoxy-type cross-linking agent and the metal chelate cross-linking agent.

The cross-linkage of the resin by at least one type of cross-linking agent selected from between the epoxy-type cross-linking agent and the metal chelate cross-linking agent improves resistance to dissolving of the resin layer 11 with the ink and fixation property of the ink on the resin layer 11 in the case of performing the decorative printing with the ink on the resin layer 11.

The cross-linking method in the resin layer 11 may include cross-linkage by heating, and combination use with cross-linkage by irradiation such as ultraviolet radiation or electron-beam radiation.

The epoxy-type cross-linking agent used for the resin layer 11 is not particularly limited as long as it leads to cross-linkage of the carboxyl group of the resin, and examples thereof include a publicly-known bisphenol A epichlorohydrin epoxy resin, ethylene glycol diglycidyl ether, polyethylene glycol diglycidyl ether, glycerin diglycidyl ether, glycerin triglycidyl ether, 1,6-hexanediol diglycidyl ether, trimethylolpropane triglycidyl ether, sorbitol polyglycidyl ether, polyglycerol polyglycidyl ether, pentaerythritol polyglycidyl erythritol, and diglycerol polyglycidyl ether.

The metal chelate cross-linking agent used for the resin layer 11 is not particularly limited as long as it leads to cross-linkage of the carboxyl group of the resin. However, for example, aluminum chelate compound having central metal of Al is preferably used.

Note that, although the detailed description will be given later, it is preferable that the type of the metal chelate cross-linking agent used for the resin layer 11 of the exemplary embodiment is different from that of the cross-linking agent (metal chelate compound) used for the adhesive layer 12.

The content of the cross-linking agent in the resin layer 11 varies depending on the type, the acid number, and the like of the resin used for the resin layer 11. However, for example, the content thereof is preferably in the range from 1 part by weight to 10 parts by weight based on 100 parts by weight of the resin, and more preferably in the range from 3 parts by weight to 8 parts by weight. By setting the content of the cross-linking agent in the resin layer 11 in such a range, crosslinkability of the resin in the resin layer 11 is improved, the strength of the resin layer 11 is maintained, and swell of the ink at the decorative printing on the resin layer 11 is suppressed.

Usually, it is preferable that the content of the cross-linking agent is increased as the acid number of the resin used for the resin layer 11 lowers in order to maintain the strength and printability of the resin layer 11.

Note that, in the case where the content of the cross-linking agent in the resin layer 11 is excessively small, increase of the cross-linking density in the resin layer 11 may not be achieved, and thus the ink may swell onto the resin layer 11 and the resin layer 11 is dissolved, or fixation property of the ink on the resin layer 11 may be decreased at the decorative printing on the resin layer 11, for example. Further, the printing plate or the like used for the decorative printing may have difficulty in peeling from the resin layer 11 at the printing, and workability at the decorative printing may decrease.

In contrast, in the case where the content of the cross-linking agent in the resin layer 11 is excessively large, the excessive amount of the cross-linking agent is in the resin layer 11, and problems such as physical property change over time due to unreacted cross-linking agent, contamination of an adherend, and crack of the resin layer 11 may be caused in some cases.

(Ultraviolet Absorbing Agent)

In the case where a cross-linking agent containing an aromatic ring is used as the cross-linking agent, the resin layer 11 may get discolored and be yellowed by ultraviolet rays if the additive amount thereof is large. In the case where the cross-linking agent containing the aromatic ring is used for the resin layer 11, yellowing of the resin layer 11 is prevented by using, for the resin layer 11 and the adhesive layer 12, an ultraviolet absorbing agent reducing transmission of the ultraviolet rays, for example.

The ultraviolet absorbing agent usable in the exemplary embodiment is not particularly limited, and examples thereof include benzophenone-based ultraviolet absorbing agents such as 2-hydroxy-4-methoxybenzophenone, 2-hydroxy-4-n-dodecyloxybenzophenone, 2-hydroxy-4-n-octoxybenzophenone, 2-hydroxy-4-methoxy-2-carboxybenzophenone, 2,4-dihydroxybenzophenone, and 2,2'-dihydroxy-4-methoxybenzophenone, benzotriazole-based ultraviolet absorbing agents such as 2-(2-hydroxy-3,5-di-t-butylphenyl)benzotriazole, 2-(2-hydroxy-5-methylphenyl) benzotriazole, and 2-(2-hydroxy-5-t-octylphenyl)benzotriazole, salicylic ester-based ultraviolet absorbing agents such as phenyl salicylate and p-octylphenyl salicylate, organic-based ultraviolet absorbing agents such as cyanoacrylate compound and benzoxazoline compound, and inorganic-based ultraviolet absorbing agents such as cerium oxide, and zinc oxide. Among them, the organic-based ultraviolet absorbing agents are preferably used, and the benzotriazole-based or benzophenone-based ultraviolet absorbing agents are more preferably used. The content of the ultraviolet absorbing agent is preferably in the range from 0.01 parts by weight to 5 parts by weight based on 100 parts by weight of the resin forming the resin layer 11.

[Adhesive Layer 12]

The adhesive layer 12 of the exemplary embodiment is formed by adhesive of a resin including a hydroxyl group, and adhesive coating containing a metal chelate compound.

(Adhesive)

The adhesive used for the adhesive layer 12 of the exemplary embodiment is not particularly limited as long as it is adhesive of a resin including a hydroxyl group. The hydroxyl value of the adhesive used for the adhesive layer 12 is preferably in the range, for example, from 1 mg/g to 80 mg/g.

The adhesive (resin) used for the adhesive layer 12 is preferably at least one type selected from between an acrylic adhesive (acrylic resin) and urethane-based adhesive (urethane-based resin). The adhesive may be singularly used, or used in combination.

For example, acrylic copolymer containing, as the main monomer component, (meth)acrylate monomer having the carbon number from 1 to 14 is preferably used as the acrylic adhesive. Examples of (meth)acrylate having the carbon number from 1 to 14 include monomers such as methyl (meth)acrylate, ethyl (meth)acrylate, n-butyl (meth)acrylate, isobutyl (meth)acrylate, t-butyl (meth)acrylate, n-hexyl (meth)acrylate, n-octyl (meth)acrylate, isooctyl (meth)acrylate, isononyl (meth)acrylate, cyclohexyl (meth)acrylate, and 2-ethylhexyl (meth)acrylate, and one or more types thereof are used. Among them, (meth)acrylate having the carbon number of the alkyl group from 4 to 12 is preferable, and (meth)acrylate having the carbon number from 4 to 9 with a linear or branching structure is more preferable. In particular, n-butyl acrylate or 2-ethylhexyl acrylate is preferably used. Note that, the aforementioned (meth)acrylate may be singularly used, or used in combination.

The urethane-based adhesive is not particularly limited, and polyetherpolyol may be used, for example.

Polyetherpolyol usable in the exemplary embodiment is not particularly limited, and known polyetherpolyol is usable. An Example thereof is polyetherpolyol obtained by polymerizing oxirane compound such as ethylene oxide, propylene oxide, butylene oxide, or tetrahydrofuran, using, as an initiator, low molecular weight polyol such as water, propylene glycol, ethylene glycol, glycerin, or trimethylolpropane. A specific example of the polyetherpolyol is polyoxyalkylene glycol such as polypropylene glycol, polyethylene glycol, polybutylene glycol, polytetramethylene glycol, and polytrimethylene glycol.

(Metal Chelate Compound)

The adhesive layer 12 of the exemplary embodiment includes a metal chelate compound as a cross-linking agent for cross-linking the hydroxyl group contained in the aforementioned adhesive (resin). As mentioned above, it is preferable that the type of the metal chelate compound used for the adhesive layer 12 and the type of the metal chelate cross-linking agent of the resin layer 11 for crosslinking the carboxyl group of the resin are different.

The metal chelate compound used for the adhesive layer 12 is not particularly limited as long as it leads to cross-linkage of the hydroxyl group contained in the adhesive (resin), and a titanium chelate compound having central metal of Ti or a zirconium chelate compound having central metal of Zr is preferably used. By using the titanium chelate compound or the zirconium chelate compound as the cross-linking agent of the adhesive layer 12, coloring of the adhesive tape 10 is suppressed, and reduction in visibility on the display apparatus due to the adhesive tape 10 is prevented.

Although the additive amount of the metal chelate compound in the adhesive layer 12 varies depending on the type of the adhesive agent, it may be, for example, in the range from 0.01 parts by weight to 10 parts by weight based on 100 parts by weight of the adhesive agent, and preferably in the range from 0.1 parts by weight to 1 part by weight.

In the case where the additive amount of the cross-linking agent in the adhesive layer 12 is excessively small, cohesion force of the adhesive layer 12 may not be improved, and displacement or peeling may occur in the case where the adhesive tape 10 is used for the display apparatus such as the liquid crystal display apparatus or the organic EL display apparatus. In contrast, in the case where the additive amount of the cross-linking agent in the adhesive layer 12 is excessively large, problems such as physical property change over time due to unreacted cross-linking agent and contamination of an adherend may be caused in some cases.

(Tackifier)

A tackifier is used for the adhesive layer 12, as necessary. Usage of the tackifier for the adhesive layer 12 improves the adhesion force of the adhesive layer 12.

Although the tackifier used for the adhesive layer 12 is not particularly limited, examples thereof include a rosin-based resin, a terpene-based resin, a terpenephenol-based resin, a synthetic petroleum resin, and hydrogenated resins thereof.

Examples of the rosin-based resin used as the tackifier include "Super Ester", "Pensel", "Ester Gum" and "Pinecrystal" series, which are manufactured by ARAKAWA CHEMICAL INDUSTRIES, LTD. An example of the terpene-based resin used as the tackifier is "Clearon" series manufactured by YASUHARA CHEMICAL CO., LTD. Examples of the terpenephenol-based resins used as the tackifier include "YS Polyster" and "Mighty Ace" series manufactured by YASUHARA CHEMICAL CO., LTD. An example of the synthetic petroleum resins used as the tackifier is "Quinton" series manufactured by Zeon Corporation.

Although the content of the tackifier with respect to the total amount of the adhesive layer 12 varies depending on the type of the adhesive agent used for the adhesive layer 12, it is preferably in the range from 20 wt. % to 40 wt. %, and more preferably in the range from 25 wt. % to 35 wt. %, for example.

[First Release Liner 21 and Second Release Liner 22]

As the first release liner 21 and the second release liner 22, a film of paper, polyethylene, polypropylene, polyethylene terephthalate or the like, on which release treatment has been processed to enhance separation from the resin layer 11 or the adhesive layer 12, may be used. Although the material used for the release treatment of the first release liner 21 and the second release liner 22 of the exemplary embodiment is not particularly limited, examples thereof include fluorosilicone, a polymer of a long-chain alkyl vinyl monomer, and an aminoalkyd-based resin.

Although the thickness of each of the first release liner 21 and the second release liner 22 is not particularly limited, it is usually in the range from 25 µm to 125 µm, for example.

[Manufacturing Method of Adhesive Tape 10]

Next, the description will be given for the manufacturing method of the adhesive tape 10 of the exemplary embodiment.

The adhesive tape 10 of the exemplary embodiment is formed by applying both of the resin layer 11 and the adhesive layer 12 to sheet members such as the first release liner 21 and the second release liner 22.

In the case where the adhesive tape 10 of the exemplary embodiment is manufactured, material coating liquid (hereinafter referred to as resin coating) as the material of the resin layer 11 and material coating liquid (hereinafter referred to as adhesive coating) as the material of the adhesive layer 12 are firstly prepared.

The resin coating is prepared by dissolving, in solvent, the aforementioned resin having the acid number of 50 mg/g or more and 130 mg/g or less, and at least one type of cross-linking agent selected from between the aforementioned epoxy-type cross-linking agent and metal chelate cross-linking agent. The adhesive coating is prepared by dissolving, in solvent, the aforementioned adhesive (resin) having the hydroxyl group and the aforementioned metal chelate compound.

Then, the prepared resin coating and adhesive coating are applied.

Figure 2:
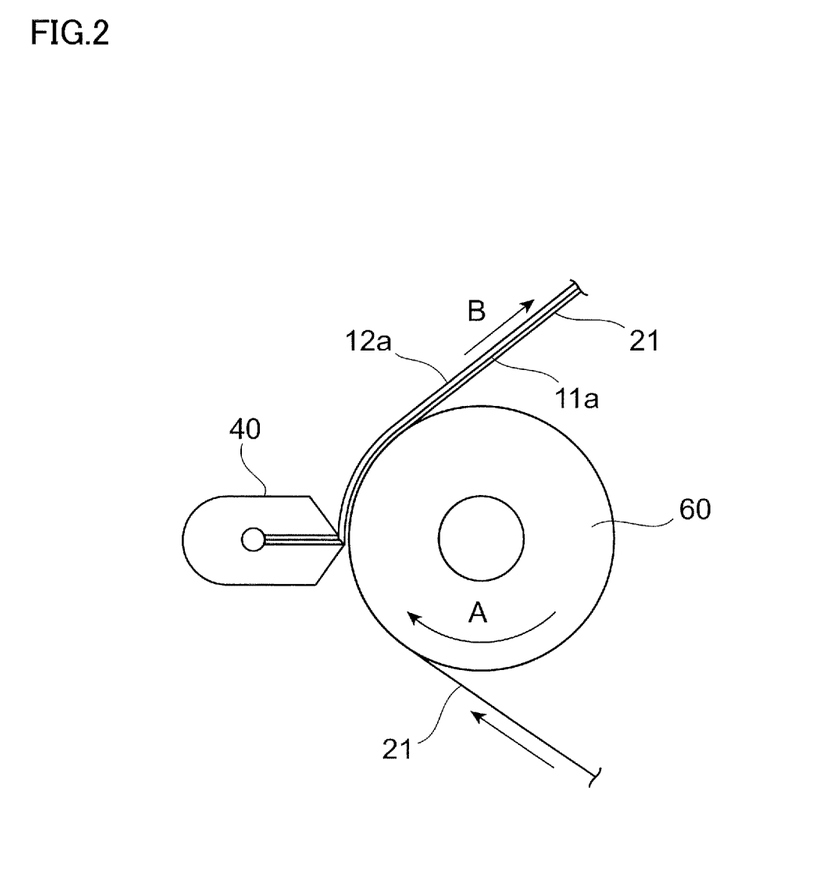
FIG. 2 is a diagram for illustrating the manufacturing method of the adhesive tape of the exemplary embodiment.

FIG. 2 is a diagram for illustrating the manufacturing method of the adhesive tape 10 (refer to FIG. 1) of the exemplary embodiment, and illustrating the state in which a resin coating 11a forming the resin layer 11 (refer to FIG. 1) and an adhesive coating 12a forming the adhesive layer 12 (refer to FIG. 1) are being applied by using a coating apparatus.

As shown in FIG. 2, the coating apparatus used for the manufacturing of the adhesive tape 10 includes a back-up roll 60 that supports the sheet member (the first release liner 21 in this specific example) from the back side thereof and rotates in an arrow A direction to transport the sheet member, and a coating die 40 that is provided to face the back-up roll 60 and for applying the materials of the resin layer 11 and the adhesive layer 12 to the sheet member (first release liner 21) transported by the back-up roll 60.

The coating die 40 of the exemplary embodiment has two discharge ports for discharging the respective materials, provided in parallel in the transportation direction of the sheet member by the back-up roll 60. One of the two discharge ports is for the resin coating 11a for forming the resin layer 11, the other one of the two discharge ports is for the adhesive coating 12a for forming the adhesive layer 12, and the two discharge ports simultaneously discharge the respective coating. Thereby, the resin layer 11 and the adhesive layer 12 are simultaneously applied onto the sheet member.

In the specific example shown in FIG. 2, the back-up roll 60 is provided on the resin layer 11 side of the adhesive tape 10, and the back-up roll 60 supports and transports the first release liner 21 fed from an unwinding shaft (not shown). The resin coating 11a for forming the resin layer 11 is discharged from the one discharge port located on the upstream side of the transportation direction of the first release liner 21 out of the two discharge ports of the coating die 40, and the adhesive coating 12a for forming the adhesive layer 12 is discharged from the other discharge port located on the downstream side of the transportation direction.

By this configuration, the resin coating 11a and the adhesive coating 12a are simultaneously applied, in the laminated state, on the first release liner 21, and thus laminated body in which the resin coating 11a and the adhesive coating 12a are laminated may be obtained.

As mentioned above, the resin coating 11a for forming the resin layer 11 includes the resin having the acid number of 50 mg/g or more and 130 mg/g or less, and at least one type of the cross-linking agent selected from between the epoxy-based cross-linking agent and the metal chelate cross-linking agent, in the exemplary embodiment. The adhesive coating 12a for forming the adhesive layer 12 includes the adhesive (resin) having the hydroxyl group, and the metal chelate compound for cross-linking the hydroxyl group. That is, in the exemplary embodiment, it is preferable that the resin coating 11a and the adhesive coating 12a contain different functional group and different type of the cross-linking agent which are used for the cross-linkage of the resin included in each of the coating. In other words, combination in which the functional group of the resin included in the resin coating 11a and the metal compound included in the adhesive coating 12a are difficult to react with each other, and also the functional group of the adhesive (resin) included in the adhesive coating 12a and the cross-linking agent included in the resin coating 11a are difficult to react with each other is preferable.

According to the above configuration, in the case where the resin coating 11a and the adhesive coating 12a are simultaneously applied so as to be stacked together in a wet state in the manufacturing process of the adhesive tape 10, a phenomenon in which viscosity of the coating is increased by contact and reaction of the resin coating 11a and the adhesive coating 12a at the surface boundary between the resin coating 11a and the adhesive coating 12a and thereby the coating is unable to be applied is suppressed, and decrease of the workability for applying the resin coating 11a and the adhesive coating 12a is suppressed. As a result, uniform and simultaneous multi-layer coating may be performed without decrease of the workability.

Note that, in the case where the resin coating 11a and/or the adhesive coating 12a gelates and the viscosity thereof increases, the resin coating 11a and the adhesive coating 12a are difficult to be applied so as to form layers, and thus the manufacture of the adhesive tape 10 is difficult. In particular, in the case where the resin coating 11a includes the resin having the carboxyl group and the adhesive coating 12a includes the aliphatic isocyanate-based cross-linking agent, the viscosity of the coatings tends to increase. Also, in the case where the resin coating 11a includes the aliphatic isocyanate-based cross-linking agent and the adhesive coating 12a includes the resin having the carboxyl group, the viscosity of the coatings tends to increase.

It is preferable that the resin coating 11a is applied so as to have the thickness of 10 μm or less after drying. Also, it is preferable that the adhesive coating 12a is applied so as to have the thickness of 15 μm or less after drying.

By setting the resin coating 11a and the adhesive coating 12a to have such ranges of thickness, the total thickness of the adhesive tape 10 obtained by adding the resin layer 11 and the adhesive layer 12 is prevented from being excessively large, and in addition, the adhesive tape 10 having the property of the resin layer 11 and the adhesion force of the adhesive layer 12 may be obtained.

The first release liner 21 on which the resin coating 11a and the adhesive coating 12a have been applied is transported in the direction shown by an arrow B in the figure. Then, the resin coating 11a and the adhesive coating 12a laminated on the first release liner 21 are heated by a heating apparatus not shown in the figure so that the solvent thereof volatilizes, and the resin layer 11 and the adhesive layer 12 are formed. After that, the second release liner 22 fed from another unwinding shaft (not shown) is overlaid and laminated on the adhesive layer 12, and aging is performed under a predetermined atmosphere. Thereby, the adhesive tape 10 having the laminated structure shown in FIG. 1 is obtained.

Figure 3:
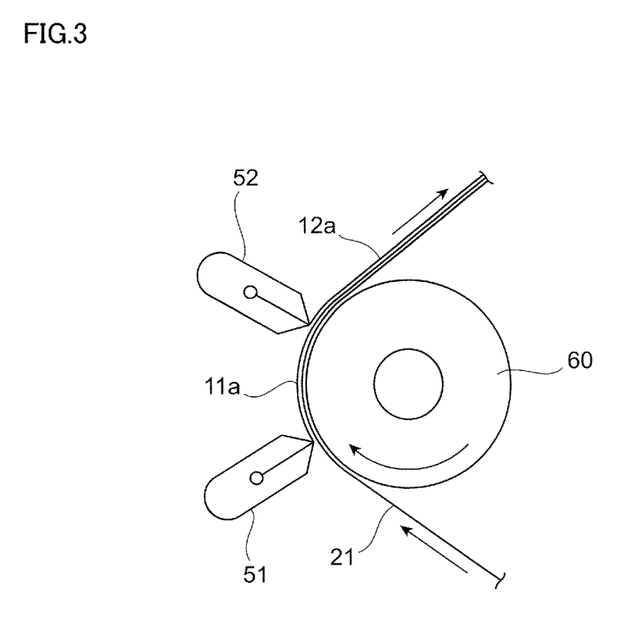
FIG. 3 is a diagram illustrating another example of the coating apparatus.

FIG. 3 is a diagram illustrating another specific example of the coating apparatus. In the specific example shown in FIG. 3, the resin coating 11a and the adhesive coating 12a are applied by a coating die 51 and a coating die 52, respectively. Specifically, in the specific example shown in FIG. 3, the resin coating 11a is firstly applied, by the coating die 51, to the first release liner 21 supported and transported by the back-up roll 60. Then, the adhesive coating 12a is further applied thereon by the coating die 52, in the wet state before the resin coating 11a dries.

As described above, in manufacturing the adhesive tape 10, the resin coating 11a and the adhesive coating 12a may be applied, in sequence, to the sheet member such as the first release liner 21.

Alternatively, in the case where the coating apparatus shown in FIG. 3 is used, the adhesive coating 12a may be applied, by the coating die 51, on the second release liner 22 supported and transported by the back-up roll 60, and then the resin coating 11a may be further applied thereon by the coating die 52, in the wet state before the adhesive coating 12a dries.

Although illustration is omitted, for example, the resin coating 11a may be applied on the first release liner 21, and dried by the heating apparatus or the like, and then the adhesive coating 12a may be applied on the dried resin coating 11a. Alternatively, the adhesive coating 12a may be applied on the second release liner 22, and dried by the heating apparatus or the like, and then the resin coating 11a may be applied on the dried adhesive coating 12a.

In the case where each of the resin coating 11a and the adhesive coating 12a are individually applied and dried on corresponding one of the first release liner 21 and the second release liner 22, and then the surface of the resin layer 11 and the surface of the adhesive layer 12 are laminated, the process to be described below is performed. That is, the resin coating 11a is applied and dried on the first release liner 21, and the resultant sheet is rolled up to prepare a raw sheet. Next, the adhesive coating 12a is applied and dried on the second release liner 22. Then, while the raw sheet of the resin layer 11, which has been former prepared, is fed from the unwinding shaft around the winding side of the coating machine for coating the adhesive coating 12a, the surface of the resin layer 11 formed on the first release liner 21 and the surface of the adhesive layer 12 formed on the second release liner 22 are bonded to each other so as to be laminated, and then the resultant sheet is rolled up.

In the case of preparing the adhesive tape 10 in the above process, loss of the length of the raw sheet or the like may be generated, which may cause yield of the adhesive tape 10 to be lowered. In addition, a foreign substance such as dust may be attached on the surface of the resin layer 11 in the process or the like in which the raw sheet of the resin layer 11 having been once rolled up is fed from the unwinding shaft around the winding side of the coating machine, and the foreign substance may be rolled up with the adhesive tape 10.

In contrast, in the exemplary embodiment where both of the resin layer 11 and the adhesive layer 12 are formed by a wet-on-wet method, individual preparation of the raw sheet of the resin layer 11 and the adhesive layer 12 is not necessary, and the loss of the length of the raw sheet may be reduced, and the yield of the adhesive tape 10 may be improved.

In addition, in the exemplary embodiment where both of the resin layer 11 and the adhesive layer 12 are formed by the wet-on-wet method, an occurrence of rolling up a foreign substance such as dust on the adhesive tape 10 is reduced, since the process in which the raw sheet of the resin layer 11 having been once rolled up is fed from the unwinding shaft around the winding side of the coating machine may be omitted. Thereby, occurrences such as problems and complaints due to defect of the foreign substance on the adhesive tape 10 may be reduced, and the adhesive tape 10 with high quality may be obtained.

Further, the exemplary embodiment where both of the resin layer 11 and the adhesive layer 12 are formed by the wet-on-wet method is preferable, since, while the one layer is in the wet state, the other layer is coated and dried, adhesiveness between the resin layer 11 and the adhesive layer 12 are improved, and the resin layer 11 and the adhesive layer 12 are difficult to be removed from each other.

Figure 4:
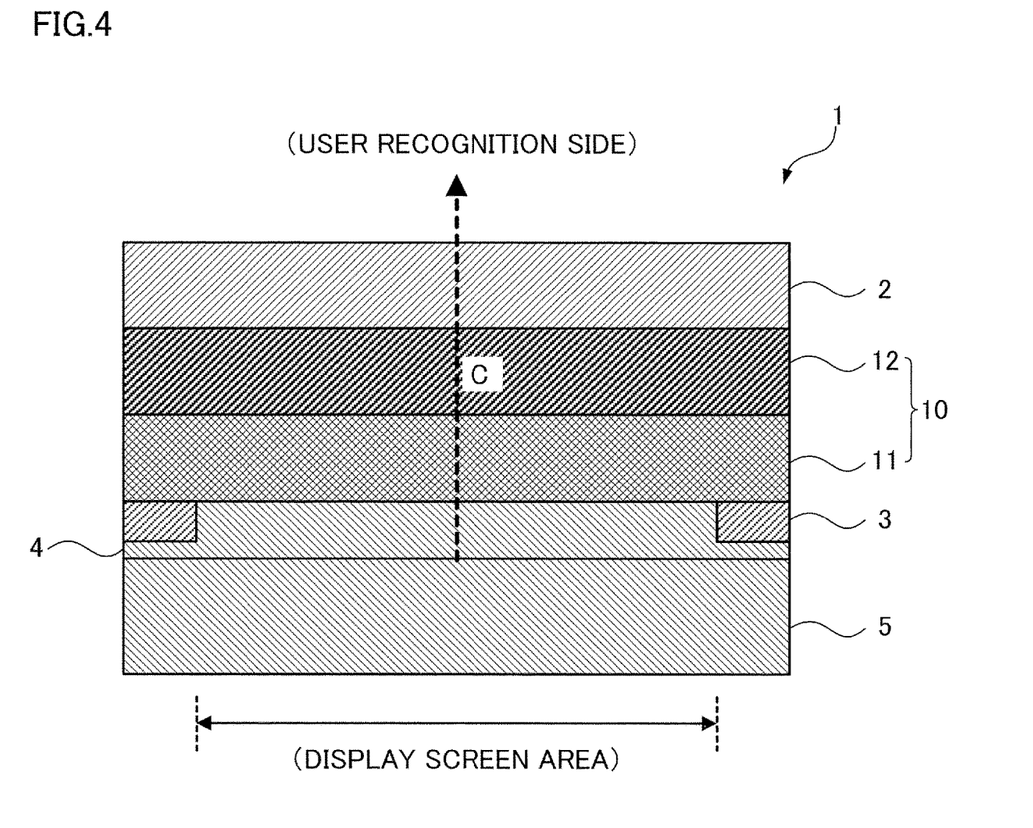
FIG. 4 is a diagram illustrating the usage state of the adhesive tape of the exemplary embodiment.

In the exemplary embodiment, the extremely high-quality adhesive tape 10 with less trouble due to defects existing at the surface and the inside may be provided for the usage in which the adhesive tape 10 is adhered to a back side of a cover glass forming a transparent panel of a display apparatus such as a liquid crystal display apparatus 1, as shown in FIG. 4 which will be described later.

Here, detection of a defect in the adhesive tape 10 may be performed by the following method using a defect detector to be described below.

Specifically, the defect detector for detecting a defect is configured by, for example, a rod-type fiber lighting device disposed on one side of a support, and a one-dimensional CCD line sensor camera disposed on the other side of the support. Detection of a defect is performed by illuminating the adhesive tape 10 with light from the rod-type fiber lighting device and continuously capturing the transmission light with the one-dimensional CCD line sensor camera. Since light scattering occurs if there is a defect in the adhesive tape 10, the number of the defects in the adhesive tape 10 and the positions and sizes of respective defects may be measured by the detection of the light scattering.

Note that the method of applying the resin coating 11a and the adhesive coating 12a in the manufacturing of the adhesive tape 10 of the exemplary embodiment is not limited to the aforementioned method using the coating apparatus (die coater), and another method such as a coating method using a comma coater, a gravure coater, a roll coater, a knife coater, or a curtain coater, or a method using two or more kinds of the above methods may be used.

[Usage Method of Adhesive Tape 10]

As mentioned above, the adhesive tape 10 of the exemplary embodiment is used in such a manner that, for example, the adhesive layer 12 side is attached to a cover glass or the like of the display apparatus such as the liquid crystal display apparatus and the organic EL display apparatus, after decorative printing is performed on part of the region on the resin layer 11 side.

For mobile phones, smartphones, PDAs (Personal Digital Assistant), electric dictionaries, a display apparatus (liquid crystal display apparatus or organic EL display apparatus) which includes a display panel such as a liquid crystal panel or an organic EL panel and a transparent panel to be attached to the front surface side of the display panel is used.

In such a display apparatus, there are problems to be solved, in order to reduce the thickness and weight of the overall apparatus, and improve transparency for improving visibility. To solve the problems, an adhesive tape, sheet and the like, of which total thickness is reduced and which are excellent in optical characteristics such as haze and total light transmittance, are used to attach various kinds of members to each other.

The display apparatus such as the liquid crystal display apparatus or the organic EL display apparatus may have a decorative portion such as various kinds of letters or characters, and a multi-color frame on the back side of the transparent panel for giving a design or distinguishability, in some cases. Further, electrodes, printed circuit, and the like with low resistance may be formed on the back side of the transparent panel in the display apparatus.

The aforementioned decorative portion, the printed circuit, and the like may be formed by directly performing decorative printing on the transparent panel or a resin formed on the transparent panel by screen printing method or the like. However, in usual cases, formation thereof may be achieved by attaching, to the transparent panel, an adhesive tape where the decorative printing has been performed in advance, in consideration of convenience in cases such as reuse of the transparent panel, processing yield of the transparent panel, and the like.

As described above, in the case where the adhesive tape is used for forming a decorative portion or the printed circuit in the display apparatus such as the liquid crystal display apparatus and the organic EL display apparatus, the adhesive tape needs to have a base material layer for the decorative printing, in addition to the adhesive layer used for attachment to the transparent panel.

Here, in order to obtain the adhesive tape with excellent optical characteristics, a PET film (optical PET film) having high optical characteristics is often used as the base material layer where the adhesive layer is laminated. However, the optical PET film which is mainly used at present is thick. Thus, in the case where the adhesive tape in which the adhesive layer is formed on the optical PET film, or hardcoat processing is performed on the optical PET film and the adhesive layer is formed on the side opposite to the hardcoat processed surface is used for the display apparatus such as the liquid crystal display apparatus and the organic EL display apparatus, it is difficult to further reduce the thickness of the display apparatus.

In addition, fixation property of ink to the optical PET film at the decorative printing is low, and the optical PET film may repel the ink, or if the print may be performed, the ink may be easily taken off by rubbing. Note that the fixation property to the film or the adhesive tape may be evaluated by, for example, a scrubbing test of the film or adhesive tape with print, performed by a finger. Specifically, fixation property of the ink may be evaluated by degree of scrab trace after scrabbing, with a finger, the printing surface of the film or the adhesive tape for a predetermined time (for example, 30 seconds).

Further, in the case where an ink accepting layer or an easily bonding layer is provided on the surface and the like of the optical PET film in order to improve the fixation property of the ink to the optical PET film in the decorative printing, the cost tends to increase. Thus, it is not preferable that the adhesive tape using the optical PET film including the ink accepting layer or the easily bonding layer is used for the display apparatus such as the liquid crystal display apparatus and the organic EL display apparatus, since the cost of the display apparatus increases.

There is an industrial PET film, as a PET film thinner than the optical PET film. However, the industrial PET film tends to have low optical characteristics such as haze and total light transmittance, in comparison with the optical PET film. Further, in the case where the industrial PET film is stored at high temperature, or at high temperature and high humidity, oligomer of PET may deposit on the surface of the film or the like, and the film may whiten in some cases. Accordingly, it is not preferable that the adhesive tape formed by the industrial PET film on which the adhesive layer has been laminated is used for the display apparatus such as the liquid crystal display apparatus and the organic EL display apparatus, since visibility on the display apparatus is lowered.

In contrast, the adhesive tape 10 of the exemplary embodiment includes the resin layer 11 instead of the PET film, as the layer for performing the decorative printing. Here, the resin layer 11 is formed by thinly applying the resin coating containing the resin having the acid number of 50 mg/g or more and 130 mg/g or less and at least one type of the cross-linking agent selected from between the epoxy-type cross-linking agent and the metal chelate cross-linking agent. By this configuration, the fixation property of the ink to the adhesive tape 10 in performing the decorative printing is improved, and the decorative portion and the printed circuit are enabled to be formed on the transparent panel of the display apparatus while the thickness and the weight of the display apparatus are reduced and the display apparatus have high transparency in the case where the adhesive tape 10 is used for the display apparatus such as the liquid crystal display apparatus and the organic EL display apparatus.

Further, no oligomer deposits on the adhesive tape 10 of the exemplary embodiment unlike the PET film since the resin layer 11 formed by the application is provided instead of the PET film, and thereby whitening of the adhesive tape 10 is inhibited. By this configuration, reduction in visibility of the display apparatus may be prevented in the case where the adhesive tape 10 is used for the display apparatus such as the liquid crystal display apparatus or the organic EL display apparatus.

FIG. 4 is a diagram illustrating the usage state of the adhesive tape 10 of the exemplary embodiment, and more specifically, a diagram illustrating the state in which the adhesive tape 10 is used in a liquid crystal display apparatus 1. Note that illustration of the detailed configuration of a liquid crystal panel 5 in the liquid crystal display apparatus 1 is omitted in FIG. 4. Hereinafter, description will be given for one example of the usage method of the adhesive tape 10 of the exemplary embodiment with reference to FIG. 4 and the like.

As shown in FIG. 4, decorative printing 3 for forming a decorative portion in the liquid crystal display apparatus 1 is performed on the resin layer 11 of the adhesive tape 10 in the exemplary embodiment. Usually, the decorative printing 3 is partially provided on the resin layer 11 of the adhesive tape 10 so as to correspond to a portion located on the outer side beyond the display screen area provided by the liquid crystal panel 5.

The method for performing the decorative printing 3 on the resin layer 11 of the adhesive tape 10 is not particularly limited, and, for example, a method such as screen printing, offset printing, gravure printing, silk printing, or pad printing may be used.

The ink used for the decorative printing 3 performed on the resin layer 11 is not particularly limited, and commercially available ink may be used. Specifically, in the case where a decorative portion by the decorative printing 3 is formed on the resin layer 11, ink containing solvent and pigments dispersed in the solvent may be used. In the case where a printed circuit by the decorative printing 3 is formed on the resin layer 11 as an example, ink containing solvent and a low-resistance material such as metal fine particles is dispersed in the solvent may be used.

In the exemplary embodiment, the resin layer 11 formed by the application of the resin coating enables the decorative printing 3 to be performed on the adhesive tape 10.

Specifically, the resin layer 11 is formed by applying the resin coating containing the resin having the acid number of 50 mg/g or more and 130 mg/g or less and at least one type of the cross-linking agent selected from between the epoxy-type cross-linking agent and the metal chelate cross-linking agent, and thereby the resin layer 11 may be given the hardness appropriate for the decorative printing 3.

Accordingly, the ink used for the decorative printing 3 is prevented from swelling on or being repelled by the resin layer 11 in performing the decorative printing 3 on the resin layer 11, and deterioration of the quality of the decorative printing 3 is prevented. The adhesive tape 10 of the exemplary embodiment is effective particularly in the case where the ink containing organic solvent and pigments dispersed in the organic solvent is used for the decorative printing 3.

Further, the aforementioned configuration of the resin layer 11 prevents a printing plate and the like from adhering to the resin layer 11 in performing the decorative printing 3 on the resin layer 11, and thus workability in performing the decorative printing 3 is improved.

The adhesive tape 10 in which the decorative printing 3 has been performed on the resin layer 11 is attached to a transparent panel 2 provided on the front surface side of the liquid crystal display apparatus 1, using the adhesive layer 12, as shown in FIG. 4.

The transparent panel 2 is one example of a cover member, and is made of, for example, a member having high transparency such as a glass plate, a (meth)acryl resin, a polycarbonate resin, or a PET resin. Usually, the glass plate (cover glass) is used in most cases. In the adhesive tape 10 of the exemplary embodiment, adhesion force of the adhesive layer 12 to the glass plate is set at 1.5 N/10 mm or more, and thereby displacement or peeling is prevented from occurring in the case where the adhesive tape 10 is used to be attached to the transparent panel 2 made of the glass plate in the liquid crystal display apparatus 1.

As shown in FIG. 4, the liquid crystal panel 5 is attached, through a resin 4 with high optical characteristics, to the resin layer 11 side having the decorative printing 3 in the adhesive tape 10 attached to the back side of the cover glass forming the transparent panel 2 in the liquid crystal display apparatus 1.

In the liquid crystal display apparatus 1, light output from the liquid crystal panel 5 passes through the display screen area where the decorative printing 3 is not performed in the adhesive tape 10 as shown by an arrow C in FIG. 4, and then is recognized by a user.

Here, the adhesive tape 10 of the exemplary embodiment has the haze of 1.5% or less, and the total light transmittance of 90% or more, as described above.

Thereby, the light output from the liquid crystal panel 5 is prevented from scattering when passing through the adhesive tape 10 in comparison with the case where this configuration is not adopted, and thus a larger amount of light is transmitted to a user. As a result, reduction in visibility on the liquid crystal display apparatus 1 may be prevented in comparison with the case where this configuration is not adopted.

In the adhesive tape 10 of the exemplary embodiment, the resin layer 11 is formed by applying the resin coating, and the adhesive layer 12 is formed by applying the adhesive coating. By this configuration, the resin layer 11 which has high optical characteristics and is thin may be obtained in comparison with the case where a film base such as a PET film is used. As a result, the total thickness obtained by adding the resin layer 11 and the adhesive layer 12 of the adhesive tape 10 may be reduced in comparison with the case where this configuration is not adopted, and specifically, the total thickness may be set at 25 μm or less.

By reducing the total thickness of the adhesive tape 10, the liquid crystal display apparatus 1 is prevented from becoming thick in the case where the adhesive tape 10 is used for the liquid crystal display apparatus 1, in comparison with the case where this configuration is not adopted, and accordingly, the thickness and the weight of the liquid crystal display apparatus 1 may be reduced.

Note that, although the specific example has been given for the adhesive tape 10 used for the liquid crystal display apparatus 1 in FIG. 4, the adhesive tape 10 of the exemplary embodiment may be used for another display apparatus on which an image is displayed, such as an organic EL display apparatus having an organic EL panel. Also in this case, the thickness and the weight of the display apparatus may be reduced while reduction in visibility on the display apparatus such as the organic EL display apparatus is suppressed, similarly to the specific example shown in FIG. 4.

The coating-type adhesive tape 10 which is formed by applying the resin coating and the adhesive coating usually has a problem that the adhesion force of the adhesive layer 12 tends to be deteriorated over time.

The problem may be caused by the cross-linking agent used for the resin layer 11 which may move to the adhesive layer 12 side through the surface boundary between the resin layer 11 and the adhesive layer 12 over time and cross-link with the adhesive (resin) forming the adhesive layer 12. In particular, in the case where an isocyanate-based cross-linking agent is used for the resin layer 11 or the adhesive layer 12, the adhesion force of the adhesive layer 12 tends to be deteriorated.

As described above, the resin layer 11 contains the resin having the acid number of 50 mg/g or more and 130 mg/g or less, and at least one type of the cross-linking agent selected from between the epoxy-type cross-linking agent and the metal chelate cross-linking agent in the exemplary embodiment. The adhesive layer 12 contains the adhesive (resin) having the hydroxyl group, and the metal chelate compound for cross-linking the hydroxyl group. In the exemplary embodiment, the type of the functional group and the type of the cross-linking agent, which are used for the cross-linkage of the resin included in each layer, are preferably different between the resin layer 11 and the adhesive layer 12. In other words, combination of the functional group of the adhesive (resin) contained in the adhesive layer 12 and the cross-linking agent contained in the resin layer 11 which are difficult to react with each other is preferable.

According to the above configuration, the cross-linking agent of the resin layer 11 is difficult to react with the adhesive (resin) of the adhesive layer 12 even in the case where the cross-linking agent moves from the resin layer 11 to the adhesive layer 12, and thus the cross-linkage of the adhesive (resin) of the adhesive layer 12 is suppressed in the adhesive tape 10 of the exemplary embodiment.

Accordingly, in the adhesive tape 10 of the exemplary embodiment, deterioration of the adhesion force of the adhesive layer 12 over time is suppressed.

EXAMPLES

Subsequently, further specific description will be given for the invention using examples and comparative examples. Note that the invention is not limited to the examples to be described below.

1. Preparation of Adhesive Coating (1) Preparation of Adhesive Coating a 0.8 parts by weight of a zirconium chelate compound as the metal chelate compound (ORGATIX ZC700 manufactured by Matsumoto Fine Chemical Co., Ltd., solid content concentration: 20 wt. %) was added to 100 parts by weight of an acrylic adhesive (Saivinol TPO3232 manufactured by SAIDEN CHEMICAL INDUSTRY CO., LTD., solid content concentration: 35 wt. %, hydroxyl number: 2.7 (mg/g), weight-average molecular weight Mw: 500,000), the resultant mixture was diluted with mixed solvent of isopropyl alcohol and toluene (mixing ratio=1:1) so as to have the solid content concentration of 23 wt. %, and then an adhesive coating a was obtained.

(2) Preparation of Adhesive Coating b 0.8 parts by weight of a titanium chelate compound as the metal chelate compound (ORGATIX TC1040 manufactured by Matsumoto Fine Chemical Co., Ltd., solid content concentration: 75 wt. %) was added to 100 parts by weight of an acrylic adhesive (Coponyl N-7520 manufactured by The Nippon Synthetic Chemical Industry Co., Ltd., solid content concentration: 35 wt. %, hydroxyl number: 50.0 (mg/g), weight-average molecular weight Mw: 700,000), the resultant mixture was diluted with mixed solvent of methylethyl ketone and toluene (mixing ratio=1:1) so as to have the solid content concentration of 23 wt. %, and then an adhesive coating b was obtained.

(3) Preparation of Adhesive Coating c 0.5 parts by weight of an isocyanate-based cross-linking agent (CORONATE HX manufactured by Nippon Polyurethane Industry Co., Ltd., solid content concentration: 100 wt. %) was added to 100 parts by weight of an acrylic adhesive (Coponyl N-7520 manufactured by The Nippon Synthetic Chemical Industry Co., Ltd., solid content concentration: 35 wt. %, hydroxyl number: 50.0 (mg/g), weight-average molecular weight Mw: 700,000), the resultant mixture was diluted with mixed solvent of methylethyl ketone and toluene (mixing ratio=1:1) so as to have the solid content concentration of 23 wt. %, and then an adhesive coating c was obtained.

2. Preparation of Resin Coating (1) Preparation of Resin Coating A 5 parts by weight of an epoxy-based cross-linking agent (E-100X manufactured by Soken Chemical & Engineering Co., Ltd., solid content concentration: 100 wt. %) was added to 100 parts by weight of an acrylic resin solution (resin I manufactured by The Nippon Synthetic Chemical Industry Co., Ltd., solid content concentration: 27 wt. %, acid number: 80 (mg/g), glass transition temperature Tg: 55° C., weight-average molecular weight Mw: 300,000), the resultant mixture was diluted with methylethyl ketone so as to have the solid content concentration of 20 wt. %, and then a resin coating A was obtained.

(2) Preparation of Resin Coating B 5 parts by weight of an epoxy-based cross-linking agent (TETRAD-C manufactured by MITSUBISHI GAS CHEMICAL COMPANY, INC., solid content concentration: 100 wt. %) was added to 100 parts by weight of an acrylic resin solution (resin II manufactured by Daido Chemical Industry Co., Ltd., solid content concentration: 30 wt. %, acid number: 60 (mg/g), glass transition temperature Tg: 20° C., weight-average molecular weight Mw: 400,000), the resultant mixture was diluted with methylethyl ketone so as to have the solid content concentration of 20 wt. %, and then a resin coating B was obtained.

(3) Preparation of Resin Coating C 5 parts by weight of an epoxy-based cross-linking agent (E-100X manufactured by Soken Chemical & Engineering Co., Ltd., solid content concentration: 100 wt. %) was added to 100 parts by weight of an acrylic resin solution (resin III manufactured by Daido Chemical Industry Co., Ltd., solid content concentration: 30 wt. %, acid number: 50 (mg/g), glass transition temperature Tg: 40° C., weight-average molecular weight Mw: 300,000), the resultant mixture was diluted with methylethyl ketone so as to have the solid content concentration of 20 wt. %, and then a resin coating C was obtained.

(4) Preparation of Resin Coating D 5 parts by weight of an epoxy-based cross-linking agent (TETRAD-C manufactured by MITSUBISHI GAS CHEMICAL COMPANY, INC., solid content concentration: 100 wt. %) was added to 100 parts by weight of an acrylic resin (HI-PEARL MA-4620 manufactured by Negami chemical industrial co., ltd., solid content concentration: 98 wt. %, acid number: 130 (mg/g), glass transition temperature Tg: 56° C., weight-average molecular weight Mw: 100,000), the resultant mixture was diluted with mixed solvent of methylethyl ketone and toluene (mixing ratio=1:1) so as to have the solid content concentration of 20 wt. %, and then a resin coating D was obtained.

(5) Preparation of Resin Coating E 10 parts by weight of an aluminum chelate compound as the metal chelate cross-linking agent (NACEM aluminum manufactured by Nihon Kagaku Sangyo Co., Ltd., solid content concentration: 100 wt. %) was added to 100 parts by weight of an acrylic resin (resin III manufactured by Daido Chemical Industry Co., Ltd., solid content concentration: 30 wt. %, acid number: 50 (mg/g), glass transition temperature Tg: 40° C., weight-average molecular weight Mw: 300,000), the resultant mixture was diluted with mixed solvent of methylethyl ketone and toluene (mixing ratio=1:1) so as to have the solid content concentration of 20 wt. %, and then a resin coating E was obtained.

(6) Preparation of Resin Coating F 5 parts by weight of an epoxy-based cross-linking agent (E-100X manufactured by Soken Chemical & Engineering Co., Ltd., solid content concentration: 100 wt. %) was added to 100 parts by weight of an acrylic resin (resin IV manufactured by The Nippon Synthetic Chemical Industry Co., Ltd., solid content concentration: 25 wt. %, acid number: 40 (mg/g), glass transition temperature Tg: 40° C., weight-average molecular weight Mw: 200,000), the resultant mixture was diluted with methylethyl ketone so as to have the solid content concentration of 20 wt. %, and then a resin coating F was obtained.

(7) Preparation of Resin Coating G 10 parts by weight of an epoxy-based cross-linking agent (TETRAD-C manufactured by MITSUBISHI GAS CHEMICAL COMPANY, INC., solid content concentration: 100 wt. %) was added to 100 parts by weight of an acrylic resin (Lioduras TH002 manufactured by TOYO INK CO., LTD., solid content concentration: 40 wt. %, acid number: 1 (mg/g), hydroxyl number: 80 (mg/g), glass transition temperature Tg: 60° C., weight-average molecular weight Mw: 50,000), the resultant mixture was diluted with methylethyl ketone so as to have the solid content concentration of 20 wt. %, and then a resin coating G was obtained.

(8) Preparation of Resin Coating H 10 parts by weight of an isocyanate-based cross-linking agent (CORONATE HX manufactured by Nippon Polyurethane Industry Co., Ltd., solid content concentration: 100 wt. %) was added to 100 parts by weight of an acrylic resin (Lioduras TH002 manufactured by TOYO INK CO., LTD., solid content concentration: 40 wt. %, acid number: 1 (mg/g), hydroxyl number: 80 (mg/g), glass transition temperature Tg: 60° C., weight-average molecular weight Mw: 50,000), the resultant mixture was diluted with methylethyl ketone so as to have the solid content concentration of 20 wt. %, and then a resin coating H was obtained.

(9) Preparation of Resin Coating I

Synthesis of an acrylic resin (solid content concentration: 30 wt. %, acid number: 150 (mg/g), weight-average molecular weight Mw: 300,000) was tried, but was difficult since aggregate of an acid component was generated in synthetic solution, so that a resin coating I was unable to be obtained.

3. Preparation of Adhesive Tape

Example 1

By using the coating apparatus shown in FIG. 2, the adhesive coating a and the resin coating A were simultaneously applied onto the release-treatment surface of the release liner (the first release liner 21, material: PET, thickness: 50 μm) fed from the unwinding shaft so that the adhesive coating a was placed on the upper side (the opposite side of the release liner with respect to the resin coating A), and the solvent was dried. Next, the other release liner (the second release liner 22, material: PET, thickness: 100 μm) fed from another unwinding shaft was overlaid on the dried adhesive coating a and laminated thereon, then aging was performed under an atmosphere at 40° C. for 72 hours, and the adhesive tape 10 shown in FIG. 1, in which the resin layer 11 and the adhesive layer 12 had been laminated, was obtained.

Note that, the thickness of the adhesive layer 12, after the drying and aging, was 7.5 μm, the thickness of the resin layer 11 was 7.5 μm, and the total thickness of the adhesive tape 10 which was obtained by adding the adhesive layer 12 and the resin layer 11 was 15 μm.

Example 2

The adhesive tape 10 in which the resin layer 11 and the adhesive layer 12 had been laminated was obtained in a similar manner to the example 1 except for using the resin coating B instead of the resin coating A.

Note that the thickness of the adhesive layer 12, after the drying and aging, was 8 μm, the thickness of the resin layer 11 was 10 μm, and the total thickness of the adhesive tape 10 which was obtained by adding the adhesive layer 12 and the resin layer 11 was 18 μm.

Example 3

The adhesive tape 10 in which the resin layer 11 and the adhesive layer 12 had been laminated was obtained in a similar manner to the example 1 except for using the resin coating C instead of the resin coating A.

Note that the thickness of the adhesive layer 12, after the drying and aging, was 10 μm, the thickness of the resin layer 11 was 8 μm, and the total thickness of the adhesive tape 10 which was obtained by adding the adhesive layer 12 and the resin layer 11 was 18 μm.

Example 4

The adhesive tape 10 in which the resin layer 11 and the adhesive layer 12 had been laminated was obtained in a similar manner to the example 1 except for using the resin coating D instead of the resin coating A.

Note that the thickness of the adhesive layer 12, after the drying and aging, was 6.5 μm, the thickness of the resin layer 11 was 7.5 μm, and the total thickness of the adhesive tape 10 which was obtained by adding the adhesive layer 12 and the resin layer 11 was 14 μm.

Example 5

The adhesive tape 10 in which the resin layer 11 and the adhesive layer 12 had been laminated was obtained in a similar manner to the example 1 except for using the resin coating E instead of the resin coating A.

Note that the thickness of the adhesive layer 12, after the drying and aging, was 8 μm, the thickness of the resin layer 11 was 8 μm, and the total thickness of the adhesive tape 10 which was obtained by adding the adhesive layer 12 and the resin layer 11 was 16 μm.

Example 6

The adhesive tape 10 in which the resin layer 11 and the adhesive layer 12 had been laminated was obtained in a similar manner to the example 1 except for using the adhesive coating b instead of the adhesive coating a, and the resin coating C instead of the resin coating A.

Note that the thickness of the adhesive layer 12, after the drying and aging, was 10 μm, the thickness of the resin layer 11 was 10 μm, and the total thickness of the adhesive tape 10 which was obtained by adding the adhesive layer 12 and the resin layer 11 was 20 μm.

Example 7

The adhesive tape 10 in which the resin layer 11 and the adhesive layer 12 had been laminated was obtained in a similar manner to the example 1 except for using the adhesive coating b instead of the adhesive coating a, and the resin coating C instead of the resin coating A.

Note that the thickness of the adhesive layer 12, after the drying and aging, was 8 μm, the thickness of the resin layer 11 was 10 μm, and the total thickness of the adhesive tape 10 which was obtained by adding the adhesive layer 12 and the resin layer 11 was 18 μm.

Comparative Example 1

The adhesive tape 10 in which the resin layer 11 and the adhesive layer 12 had been laminated was obtained in a similar manner to the example 1 except for using the resin coating F instead of the resin coating A.

Note that the thickness of the adhesive layer 12, after the drying and aging, was 7.5 μm, the thickness of the resin layer 11 was 7.5 μm, and the total thickness of the adhesive tape 10 which was obtained by adding the adhesive layer 12 and the resin layer 11 was 15 μm.

Comparative Example 2

The adhesive tape 10 in which the resin layer 11 and the adhesive layer 12 had been laminated was obtained in a similar manner to the example 1 except for using the adhesive coating b instead of the adhesive coating a, and the resin coating G instead of the resin coating A.

Note that the thickness of the adhesive layer 12, after the drying and aging, was 10 μm, the thickness of the resin layer 11 was 10 μm, and the total thickness of the adhesive tape 10 which was obtained by adding the adhesive layer 12 and the resin layer 11 was 20 μm.

Comparative Example 3

The adhesive tape 10 in which the resin layer 11 and the adhesive layer 12 had been laminated was obtained in a similar manner to the example 1 except for using the adhesive coating c instead of the adhesive coating a, and the resin coating H instead of the resin coating A.

Note that the thickness of the adhesive layer 12, after the drying and aging, was 8 μm, the thickness of the resin layer 11 was 10 μm, and the total thickness of the adhesive tape 10 which was obtained by adding the adhesive layer 12 and the resin layer 11 was 18 μm.

The configurations of the respective adhesive tapes 10 of examples 1 to 7 and comparative examples 1 to 3 are shown in Table 1.

TABLE 1

|  |  |  | Example 1 | Example 2 | Example 3 | Example 4 | Example 5 | Example 6 | Example 7 | Comparative example 1 | Comparative example 2 | Comparative example 3 |
|---|---|---|---|---|---|---|---|---|---|---|---|---|
| Adhesive layer | Adhesive coating |  | a | a | a | a | a | b | b | a | b | c |
|  | Adhesive | Type | Acrylic | Acrylic | Acrylic | Acrylic | Acrylic | Acrylic | Acrylic | Acrylic | Acrylic | Acrylic |
|  |  | Hydroxyl number (mg/g) | 2.7 | 2.7 | 2.7 | 2.7 | 2.7 | 50.0 | 50.0 | 2.7 | 50.0 | 50.0 |
|  |  | Weight-average molecular weight Mw | 500,000 | 500,000 | 500,000 | 500,000 | 500,000 | 700,000 | 700,000 | 500,000 | 700,000 | 700,000 |
|  |  | Additive amount (parts by weight) | 100 | 100 | 100 | 100 | 100 | 100 | 100 | 100 | 100 | 100 |
|  | Cross-linking agent | Type | Zr chelate | Zr chelate | Zr chelate | Zr chelate | Zr chelate | Ti chelate | Ti chelate | Zr chelate | Ti chelate | Isocyanate-based |
|  |  | Additive amount (parts by weight) | 0.8 | 0.8 | 0.8 | 0.8 | 0.8 | 0.8 | 0.8 | 0.8 | 0.8 | 0.5 |
| Resin layer | Resin coating |  | A | B | C | D | E | C | C | F | G | H |
|  | Resin | Type | Acrylic | Acrylic | Acrylic | Acrylic | Acrylic | Acrylic | Acrylic | Acrylic | Acrylic | Acrylic |
|  |  | Acid number (mg/g) | 80 | 60 | 50 | 130 | 50 | 50 | 50 | 40 | 1 | 1 |
|  |  | Hydroxyl number (mg/g) | — | — | — | — | — | — | — | — | 80 | 80 |
|  |  | Glass transition temperature Tg | 55 | 20 | 40 | 56 | 40 | 40 | 40 | 40 | 60 | 60 |
|  |  | Weight-average molecular weight Mw | 300,000 | 400,000 | 300,000 | 100,000 | 300,000 | 300,000 | 300,000 | 200,000 | 50,000 | 50,000 |
|  |  | Additive amount (parts by weight) | 100 | 100 | 100 | 100 | 100 | 100 | 100 | 100 | 100 | 100 |
|  | Cross-linking agent | Type | Epoxy-based | Epoxy-based | Epoxy-based | Epoxy-based | Al chelate | Epoxy-based | Epoxy-based | Epoxy-based | Epoxy-based | Isocyanate-based |
|  |  | Additive amount (parts by weight) | 5 | 5 | 5 | 5 | 10 | 5 | 5 | 5 | 10 | 10 |
| Thinckness (μm) | Adhesive layer |  | 7.5 | 8 | 10 | 6.5 | 8 | 10 | 8 | 7.5 | 10 | 8 |
|  | Resin layer |  | 7.5 | 10 | 8 | 7.5 | 8 | 10 | 10 | 7.5 | 10 | 10 |
|  | Total thickness |  | 15 | 18 | 18 | 14 | 16 | 20 | 18 | 15 | 20 | 18 |

4. Evaluation (1) Evaluation for Printability

Screen printing was performed on the resin layer 11 side of each of the adhesive tapes 10 obtained by the examples 1 to 7 and the comparative examples 1 to 3, with silver paste in which silver fine particles were dispersed in solvent, and the printability was evaluated. The printability was evaluated using following references:

A: Good printability in screen printing
B: Not too bad printability in screen printing
C: Bad printability in screen printing Note that, in the evaluation for the printability of the adhesive tape 10, A and B are recognized as the adhesive tape 10 within the acceptable range when being used in the display apparatus, and C is recognized as the adhesive tape 10 out of the acceptable range when being used in the display apparatus.

(2) Evaluation for Adhesion Force

In conformity with the method mentioned in JIS Z 0237, 180° peeling force of each of the adhesive tapes 10 obtained by the examples 1 to 7 and the comparative examples 1 to 3, with respect to a glass plate, was measured. Note that the adhesion force was measured just after the preparation of the adhesive tape 10 and after a lapse of 72 hours.

(3) Measurement of Total Light Transmittance and Haze

The total light transmittance and the haze of each of the adhesive tapes 10 obtained by the examples 1 to 7 and the comparative examples 1 to 3 were measured using a spectrophotometer V-670 (integrating sphere) manufactured by JASCO Corporation. The total light transmittance and the haze were measured in the state where the release liner (first release liner 21) on the resin layer 11 side and the release liner (second release liner 22) on the adhesive layer 12 side were removed.

5. Evaluation Result

The evaluation result of the adhesive tapes 10 of the examples 1 to 7 and the comparative examples 1 to 3 is shown in Table 2.

TABLE 2

| | | | Example 1 | Example 2 | Example 3 | Example 4 | Example 5 | Example 6 | Example 7 | Comparative example 1 | Comparative example 2 | Comparative example 3 |
|---|---|---|---|---|---|---|---|---|---|---|---|---|
| Evaluation result | Printability | | A | A | A | A | A | A | A | C | C | A |
| | Adhesion force to glass plate (N/10 mm) | Initial | 4.16 | 4.34 | 4.26 | 4.12 | 3.96 | 4.08 | 4.22 | 4.30 | 4.44 | 3.68 |
| | | After 72 H | 4.41 | 4.38 | 4.24 | 4.22 | 3.96 | 4.20 | 4.26 | 4.20 | 4.46 | 0.82 |
| | Total light transmittance (%) | | 91.8 | 91.9 | 92.0 | 92.1 | 91.8 | 91.8 | 91.9 | 92.1 | 92.1 | 91.9 |
| | Haze (%) | | 0.4 | 0.3 | 0.4 | 0.4 | 0.3 | 0.3 | 0.3 | 0.3 | 0.3 | 0.3 |

As shown in Table 2, it was confirmed that the adhesive tape 10 in each of the examples 1 to 7 had good printability and deterioration of the adhesion force over time was suppressed. Specifically, the adhesive tape 10 in each of the examples 1 to 7 was confirmed to be evaluated as A for the printability. In addition, in the adhesive tape 10 in each of the examples 1 to 7, the adhesion force to the glass plate was confirmed to hardly deteriorate after the lapse of 72 hours.

Further, it was confirmed that the adhesive tape 10 with good optical characteristics was obtained in each of the examples 1 to 7. Specifically, it was confirmed that the haze of the adhesive tape 10 was 1.5% or less, and the total light transmittance thereof was 90% or more.

Accordingly, the adhesive tape 10 in each of the examples 1 to 7 was confirmed to be appropriate to be used for the display apparatus such as the liquid crystal display apparatus and the organic EL display apparatus while decorative printing 3 such as a decorative portion and printed circuit was performed on the resin layer 11 side, for example.

In contrast, it was confirmed that ink swelled on the resin layer 11 of the adhesive tape 10 in the comparative examples 1 and 2 in the case where decorative printing was performed on the resin layer 11 in the evaluation for the printability. In other words, it was confirmed that the printability of the adhesive tape 10 in each of the comparative examples 1 and 2 was lower than that of the adhesive tape 10 in each of the examples 1 to 7.

It may be caused by insufficient cross-linkage of the resin layer 11 due to the acid number of the resin used for the resin layer 11 being less than 50 mg/g.

It was confirmed that the adhesion force of the adhesive tape 10 in the comparative example 3 deteriorated over time while the adhesive tape 10 had good printability. More specifically, the adhesion force after the lapse of 72 hours was 1 N/10 mm or less, and the adhesive tape 10 in the comparative example 3 was confirmed to be inappropriate to be used for the display apparatus.

It may be caused by movement of the isocyanate-based cross-linking agent of the resin layer 11 to the adhesive layer 12 and cross-linkage with the adhesive (resin) of the adhesive layer 12.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An adhesive tape having no base sheet of a PET film comprising:
   a resin layer that is formed by applying a resin coating, the resin coating containing a resin having an acid number of 50 mg/g or more and 130 mg/g or less, and at least one type of cross-linking agent selected from an epoxy-based cross-linking agent and a metal chelate cross-linking agent, the resin layer being capable of having decorating printing on the resin layer; and
   an adhesive layer that is laminated on or above the resin layer, and is formed by applying an adhesive coating, the adhesive coating containing a resin including a hydroxyl group, and a metal chelate compound,
   wherein the resin having the acid number, contained in the resin layer, is at least one type selected from among an acrylic resin, a polyester resin, and an urethane resin,
   a weight-average molecular weight of the resin having the acid number, contained in the resin layer is equal to or more than 100,000 and equal to or less than 400,000,
   a glass transition temperature (Tg) of the resin having the acid number, contained in the resin layer is 20° C. or more, and
   the metal chelate cross-linking agent and the metal chelate compound are different.

2. The adhesive tape according to claim 1, wherein the resin in the adhesive layer is at least one resin selected from an acrylic resin and an urethane resin.

3. The adhesive tape according to claim 1, wherein the thickness of the resin layer is 10 μm or less, and the thickness of the adhesive layer is 15 μm or less.

4. The adhesive tape according to claim 1, wherein a central metal of the metal chelate cross-linking agent is aluminum, and a central metal of the metal chelate compound is selected from at least one of zirconium (Zr) and titanium (Ti).

5. The adhesive tape according to claim 1, wherein the glass transition temperature (Tg) of the resin in the resin layer is 105° C. or less.

6. The adhesive tape according to claim 1, wherein the resin in the resin layer, is an acrylic resin.

7. The adhesive tape according to claim 1, wherein
a first release liner is laminated on the resin layer and a second release liner is laminated on the adhesive layer.

8. An adhesive tape having no base sheet of a PET film comprising:
a resin layer that is formed by applying a resin coating, the resin coating containing a resin having an acid number of 50 mg/g or more and 130 mg/g or less, and at least one type of cross-linking agent selected from an epoxy-based cross-linking agent and a metal chelate cross-linking agent; and
an adhesive layer that is laminated on or above the resin layer, and is formed by applying an adhesive coating, the adhesive coating containing a resin including a hydroxyl group, and a metal chelate compound,
wherein the resin having the acid number, contained in the resin layer, is at least one type selected from among an acrylic resin, a polyester resin, and an urethane resin,
a glass transition temperature (Tg) of the resin having the acid number, contained in the resin layer is 20° C. or more,
the metal chelate cross-linking agent and the metal chelate compound are different,
the thickness of the resin layer is 10 μm or less, and
the thickness of the adhesive layer is 15 μm or less.

* * * * *